United States Patent
Tomic et al.

(10) Patent No.: US 11,214,366 B2
(45) Date of Patent: Jan. 4, 2022

(54) WIND MEASUREMENT BY MEANS OF A MULTICOPTER

(71) Applicant: CAVOS BAGATELLE VERWALTUNGS GMBH & CO. KG, Munich (DE)

(72) Inventors: Teodor Tomic, Munich (DE); Philipp Lutz, Gilching (DE); Sami Haddadin, Hannover (DE)

(73) Assignee: Cavos Bagatelle Verwaltungs GmbH & Co. KG, Munich (DE)

( * ) Notice: Subject to any disclaimer, the term of this patent is extended or adjusted under 35 U.S.C. 154(b) by 123 days.

(21) Appl. No.: 16/340,018

(22) PCT Filed: Oct. 9, 2017

(86) PCT No.: PCT/EP2017/001190
§ 371 (c)(1),
(2) Date: Apr. 5, 2019

(87) PCT Pub. No.: WO2018/065096
PCT Pub. Date: Apr. 12, 2018

(65) Prior Publication Data
US 2019/0241076 A1   Aug. 8, 2019

(30) Foreign Application Priority Data
Oct. 7, 2016  (DE) .......................... 102016119152.3

(51) Int. Cl.
*B64C 39/02* (2006.01)
*G01P 5/00* (2006.01)
(Continued)

(52) U.S. Cl.
CPC ............ *B64C 39/024* (2013.01); *B60L 15/20* (2013.01); *G01P 5/00* (2013.01); *G01P 13/025* (2013.01);
(Continued)

(58) Field of Classification Search
CPC .. G01P 5/00; G01P 13/025; G01P 5/02; G01P 5/06; G01P 5/07; B64C 39/024;
(Continued)

(56) References Cited

U.S. PATENT DOCUMENTS

| | | | |
|---|---|---|---|
| 5,091,871 A | * | 2/1992 | Arethens ................... G01P 5/00 340/968 |
| 5,214,596 A | | 5/1993 | Müller |

(Continued)

OTHER PUBLICATIONS

Bangura, Moses et al., "Nonlinear Dynamic Modeling for High Performance Control of a Quadrotor," Proceedings of Australasian Conference on Robotics and Automation, Dec. 3-5, 2012, ACRA 2012, Victoria University of Wellington, New Zealand, 10 pages (Year: 2012).*

(Continued)

*Primary Examiner* — David A Testardi
(74) *Attorney, Agent, or Firm* — Hoffmann & Baron, LLP (57) ABSTRACT

A multicopter including motors driving propellers, a first interface providing parameters including: a position of a center of gravity of the multicopter, time derivatives, an orientation of the multicopter and its time derivative; a second interface providing power generated by respective propellers; a first unit, based on the parameters, a provided model that describes dynamics of the multicopter, and an estimation of a force wrench acting externally on the multicopter, the estimation based on based on the model, determines horizontal components of a relative speed of the multicopter in relation to air; a second unit which, based on the horizontal components and power, determines a vertical component of the relative speed; a third unit which, based on the horizontal components, vertical component, and parameters, determines a wind speed in an inertial system; and a storage unit to store wind speeds and/or a transmission unit to wirelessly transmit the wind speeds.

22 Claims, 2 Drawing Sheets

(51) Int. Cl.
 *B60L 15/20* (2006.01)
 *G01P 13/02* (2006.01)
(52) U.S. Cl.
 CPC ..... *B60L 2200/10* (2013.01); *B64C 2201/027* (2013.01); *B64C 2201/042* (2013.01); *B64C 2201/108* (2013.01); *B64C 2201/141* (2013.01)
(58) Field of Classification Search
 CPC ........ B64C 2201/141; B64C 2201/042; B64C 2201/108; B60L 15/20; G05D 1/0204; G05D 1/104
 See application file for complete search history.

(56) References Cited

U.S. PATENT DOCUMENTS

| | | | | |
|---|---|---|---|---|
| 5,596,332 | A * | 1/1997 | Coles | G01S 5/0009 342/455 |
| 8,219,267 | B2 | 7/2012 | Hamke et al. | |
| 9,321,517 | B1 * | 4/2016 | DeVaul | G01W 1/08 |
| 9,665,103 | B1 * | 5/2017 | Bonawitz | G01P 5/00 |
| 10,023,323 | B1 * | 7/2018 | Roberts | B64D 43/00 |
| 2010/0241294 | A1 * | 9/2010 | Virelizier | G01P 5/16 701/14 |
| 2011/0295569 | A1 * | 12/2011 | Hamke | G01P 5/00 703/2 |
| 2013/0013131 | A1 * | 1/2013 | Yakimenko | G05D 1/0684 701/3 |
| 2013/0175391 | A1 * | 7/2013 | DeVaul | G05D 1/105 244/96 |
| 2013/0204467 | A1 * | 8/2013 | Spinelli | G05D 1/0204 701/3 |
| 2014/0129057 | A1 * | 5/2014 | Hall | G05D 1/0202 701/7 |
| 2015/0057844 | A1 * | 2/2015 | Callou | B64C 39/024 701/3 |
| 2016/0109475 | A1 * | 4/2016 | Downs | G01P 5/00 702/142 |
| 2016/0214715 | A1 | 7/2016 | Meffert | |
| 2016/0293018 | A1 * | 10/2016 | Kim | G05D 1/104 |
| 2017/0227968 | A1 * | 8/2017 | Klinger | H01Q 3/26 |
| 2019/0187168 | A1 * | 6/2019 | Mukai | G01P 13/045 |
| 2019/0265735 | A1 * | 8/2019 | Ishikawa | B64C 39/02 |

OTHER PUBLICATIONS

Bangura, Moses et al., "Aerodynamic Power Control for Multirotor Aerial Vehicles", 2014 IEEE International Conference on Robotics & Automation (ICRA), May 31-Jun. 7, 2014, Hong Kong, China, pp. 529 to 536 (Year: 2014).*
Moyano Cano, Javier, "Quadrotor UAV for wind profile characterization", University Carlos III de Madrid project, from: https://e-archivo.uc3m.es/handle/10016/18105, Publication Date: Jan. 9, 2014, 85 pages (Year: 2014).*
Tomic, Teodor et al., "Simultaneous Estimation of Aerodynamic and Contact Forces in Flying Robots: Applications to Metric Wind Estimation and Collision Detection", 2015 IEEE International Conference on Robotics and Automation (ICRA), Seattle, Washington, May 26-30, 2015, pp. 5290 to 5296 (Year: 2015).*
Qu, Yaohong et al., "Wind Estimation Using the Position Information from a Hovering Quadrotor", Proceedings of 2016 IEEE Chinese Guidance, Navigation and Control Conference, Aug. 12-14, 2016 Nanjing, China, pp. 1345 to 1350 (Year: 2016).*
Tomić, Teodor et al., "Simultaneous Contact and Aerodynamic Force Estimation (s-CAFE) for Aerial Robots", arXiv Paper arXiv: 1810.12908v1 [cs.RO] Oct. 30, 2018, submitted to arXiv for publication on Oct. 30, 2018, 40 pages (Year: 2018).*

Tomić, Teodor, "Model-Based Control of Flying Robots for Robust Interaction under Wind Infuence", Dr.-ing. Dissertation, Gottfried Wilhelm Leibniz Universitat (Leibniz University Hannover), 2018, 156 pages (Year: 2018).*
English translation of the International Preliminary Report on Patentability issued in International Application No. PCT/EP2017/001190 dated Apr. 18, 2019.
Tomić, Teodor, et al., "Simultaneous Estimation of Aerodynamic and Contact Forces in Flying Robots: Applications to Metric Wind Estimation and Collision Detection", IEEE International Conference on Robotics and Automation (ICRA), Seattle, WA., May 26, 2015, pp. 5290-5296.
Tomić, Teodor, et al., "The Flying Anemometer: Unified Estimation of Wind Velocity from Aerodynamic Power and Wrenches", IEEE/RDJ International Conference on Intelligent Robots and Systems(IROS), Daejeon, Korea, Oct. 9, 2016, pp. 1637-1644.
Bangura, M., et al., "Aerodynamic Power Control for Multirotor Aerial Vehicles", IEEE International Conference on Robotics and Automation (ICRA), May 31, 2014-Jun. 7, 2014, Hong Kong, China, pp. 529-536.
Tomić, Teodor, "Evaluation of Acceleration-Based Disturbance Observation for Multicopter Control", European Control Conference (ECC), 2014, pp. 2937-2944.
Baldi, P., et al., "Generic wind estimation and compensation based on NLGA and RBF-NN", 2014 European Control Conference (ECC) Jun. 24-27, 2014, Strasbourg, France, pp. 1729-1734.
Huang, Haomiao, et al., "Aerodynamics and Control of Autonomous Quadrotor Helicopters in Aggressive Maneuvering", 2009 IEEE International Conference on Robotics and Automation Kobe International Conference Center, Kobe, Japan, May 12-17, 2009, pp. 3277-3282.
Langelaan, Jack W., et al., "Wind Field Estimation for Small Unmanned Aerial Vehicles", AIAA Guidance, Navigation and Control Conference, Toronto, Canada, American Institute of Aeronautics and Astronautics Paper 2010-8177, 2010.
Marino, Matthew, et al., "An Evaluation of Multi-Rotor Unmanned Aircraft as Flying Wind Sensors", RMIT University, Melbourne, Australia, 2015.
Martin, Philippe, et al., "The True Role of Accelerometer Feedback in Quadrotor Control", 2010 IEEE International Conference on Robotics and Automation, Anchorage Convention District, May 3-8, 2010, Anchorage, Alaska, USA, pp. 1623-1629.
Mayer, Stephanie, et al., "A 'no-flow-sensor' Wind Estimation Algorithm for Unmanned Aerial Systems", International Journal of Micro Air Vehicles, vol. 4, No. 1, 2012.
Omari, Sammy, et al., "Nonlinear Control of VTOL UAVs Incorporating Flapping Dynamics", 2013 IEEE/RSJ International Conference on Intelligent Robots and Systems (IROS), Nov. 3-7, 2013, Tokyo, Japan, pp. 2419-2425.
Planckaert, L., et al., "Quadrotor UAV aerodynamic model identification using indoor flight experiment and feasibility of UAV as wind gust sensor", International Micro Air Vehicles Conference and Flight Competition IMAV, Aachen, Germany 2015, pp. 1-6.
Schiano, Fabrizio, et al., "Towards Estimation and Correction of Wind Effects on a Quadrotor UAV", IMAV, 2014, pp. 134-141.
Sydney, Nitin, et al., "Dynamic Control of Autonomous Quadrotor Flight in an Estimated Wind Field", Graduate School of the University of Maryland, 2013.
Sydney, Nitin, "Rotorcraft Flight Dynamics and Control in Wind for Autonomous Sampling of Spatiotemporal Processes", Graduate School of the University of Maryland, 2015.
Waslander, Steven L., et al., "Wind Disturbance Estimation and Rejection for Quadrotor Position Control", AIAA Infotech@Aerospace Conference and AIAA Unmanned, Unlimited Conference, Apr. 6-9, 2009, Seattle, Washington.
Hoffmann, Gabriel M., et al., "Quadrotor Helicopter Flight Dynamics and Control: Theory and Experiment", AIAA Guidance, Navigation and Control Conference and Exhibit, Aug. 20-23, 2007, Hilton Head, South Carolina.

* cited by examiner

WIND MEASUREMENT BY MEANS OF A MULTICOPTER

CROSS-REFERENCE TO RELATED APPLICATIONS

The present application is the U.S. National Phase of PCT/EP2017/001190, filed on Oct. 9, 2017, which claims priority to German Patent Application No. 10 2016119152.3, filed on Oct. 7, 2016, the entire contents of which are incorporated herein by reference.

BACKGROUND

Field

The invention relates to a multicopter, using which wind measurements can be carried out, and a method, system, and storage medium for wind measurement by means of a multicopter. In particular, the invention relates to a multicopter that is a free-flying drone or a free-flying robot driven by multiple propellers.

Related Art

Multicopters which are configured for wind measurement are known in the prior art. Thus, a multicopter is disclosed in the publication: "Simultaneous Estimation of Aerodynamic and Contact Forces in Flying Robots: Application to Metric Wind Estimations and Collision Detection", ICRA 2015, Seattle, Wash. USA May 2015, pages: 5290-5296 of the present inventors: Tomic T. and Haddadin S., which, on the basis of an estimation of a force wrench $\tau_e$ acting externally on the multicopter, enables the estimation of a wind speed. The disclosure of this article, in particular the chapters: "III Modeling" and "IV Incorporating Aerodynamics into external Wrench Estimation" is hereby explicitly incorporated into the content of the disclosure of this description.

A controller of a multicopter is disclosed in the article "Aerodynamic Power Control for Multirotor Aerial Vehicles" by Bangura M. et al., in: IEEE International Conference on Robotics and Automation (ICRA), 31.05.-07.06.2014 Hong Kong, China, which has robust behavior in relation to wind disturbance and ground effects.

A method is known from U.S. Pat. No. 8,219,267 B2, using which the wind speed can be estimated during the operation of a UAV.

SUMMARY OF THE INVENTION

The object of the present invention is to specify a multicopter and a method for operating a multicopter, using which an improved wind measurement is possible.

The invention results from the features of the independent claims. Advantageous refinements and embodiments are the subject matter of the dependent claims. Further features, possible applications, and advantages of the invention result from the following description, and also the explanation of example embodiments of the invention which are illustrated in the figures.

One aspect of the invention relates to a multicopter having: a number N of electric motors $MOT_n$ for driving N propellers $PROP_n$, where n=1, 2, . . . N and N≥2, a first interface for providing first parameters P1 including: a 3D position $r_B=(x_b, y_b, z_b)$ of the center of gravity B of the multicopter, the time derivatives: $\dot{r}_B$ and $\ddot{r}_B$, a 3D orientation $o_M=(\alpha_M, \beta_M, \gamma_M)$ of the multicopter and its time derivative $\dot{o}_M$, a second interface for providing an aerodynamic power $P_{a,n}$ currently generated by the respective propellers $PROP_n$, a unit 803, which, on the basis of the first parameters P1 and/or the aerodynamic power $P_{a,n}$ and/or an estimation of one or more force wrenches $\tau_e$ externally acting on the multicopter, determines a relative speed $v_r:=(v_{r,x}, v_{r,y}, v_{r,z})^T$ of the multicopter in relation to the air, a unit 805, which, on the basis of the determined relative speed $v_r:=(v_{r,x}, v_{r,y}, v_{r,z})^T$ and on the basis of the parameter P1, determines the wind speed $v_w$ in an inertial system, and a storage unit for storing the wind speeds $v_w(r_B)=(v_{w,x}(r_B), v_{w,y}(r_B), v_{w,z}(r_B))$ determined for the locations $r_B$ and/or a transmission unit for the wireless transmission of the wind speed $v_w(r_B)$ to a receiver.

The determination of the relative speed $v_r:=(v_{r,x}, v_{r,y}, v_{r,z})^T$ of the multicopter in relation to the air is advantageously performed by means of methods of neuronal learning and/or autonomous robot learning.

The arrangements of the propeller planes on the multicopter are fundamentally arbitrary in this case. The determination of the relative speed $v_r:=(v_{r,x}, v_{r,y}, v_{r,z})^T$ therefore includes combinations of the estimated force wrench and the estimated power.

If the propeller planes are arranged essentially parallel and in particular in one plane, the following special case thus results.

A further aspect of the invention relates to a multicopter having: a number N of electric motors $MOT_n$ for driving N propellers $PROP_n$, where n=1, 2, . . . , N and N≥2, a first interface for providing first parameters P1 including: a 3D position $r_B=(x_b,y_b,z_b)$ of the center of gravity B of the multicopter (or providing items of information from which the position $r_B=(x_b,y_b,z_b)$ of the center of gravity B of the multicopter can be determined/estimated), the time derivatives: $\dot{r}_B$ and $\ddot{r}_B$, a 3D orientation $o_M=(\alpha_M, \beta_M, \gamma_M)$ of the multicopter and its time derivative $\dot{o}_M$ (the variables $\dot{r}_B$, $\ddot{r}_B$, $o_M=(\alpha_M, \beta_M, \gamma_M)$, $\dot{o}_M$ are advantageously measured (for example, by means of GPS, LIDAR, cameras, etc., one or more inertial measuring units (IMU)) etc., observed, or derived (for example, by visual odometry, sensor data fusion such as Kalman filters etc.), a second interface for providing an aerodynamic power $P_{a,n}$ currently generated by the respective propellers $PROP_n$ (which is advantageously measured or observed), a first unit, which, on the basis of the first parameters P1, on the basis of a provided model M1 for describing dynamics of the multicopter, and on the basis of an estimation of a force wrench $\tau_e$ acting externally on the multicopter, wherein the estimation is determined based on the model M1, determines horizontal components $(v_{r,x}, v_{r,y})$ of a relative speed $v_r:=(v_{r,x}, v_{r,y}, v_{r,z})^T$ of the multicopter in relation to the air (for this purpose function approximators are advantageously used, which are known from the field of "machine learning", for example, linear regression, neuronal networks, multilayer perceptrons, support vector machines (SVM) etc.), a second unit which, on the basis of the determined horizontal components $(v_{r,x}, v_{r,y})$, and on the basis of the aerodynamic power $P_{a,n}$, determines the vertical component $(v_{r,z})$ of the relative speed $v_r$, a unit, which, on the basis of the determined horizontal components $(v_{r,x}, v_{r,y})$, the vertical component $(v_{r,z})$, and also on the basis of the parameters P1, determines the wind speed $v_w$ in an inertial system, a storage unit for storing the wind speeds $v_w(r_B)=(v_{w,x}(r_B), v_{w,y}(r_B), v_{w,z}(r_B))$ determined for the locations $r_B$ and/or a transmission unit for wirelessly transmitting the wind speed $v_w(r_B)$ to a receiver.

In the present case, the term "multicopter" describes an aircraft which has two or more drive units, in particular motor-driven propellers. The multicopter can also have lift and/or control surfaces. The arrangement of the N propellers $PROP_n$ on the multicopter is arbitrary in principle. Each propeller is advantageously described in its own coordinate system. The N propellers $PROP_n$ can advantageously be vectored, i.e., each propeller can be described in its own time-variable coordinate system. The method can accordingly be generalized in principle to other arrangements, in which the arrangement of the propellers is not necessarily in one plane. The corresponding required combinations of the estimators is derivable in an obvious manner from the described common case.

In principle, the proposed method can in other words execute a regression from the external force wrench $\tau_e$ to the relative speed $v_r$, a regression from the aerodynamic powers $P_{a,n}$ to the relative speed $v_r$, and/or a regression from the external force wrench $\tau_e$ and the aerodynamic powers $P_{a,n}$ to the relative speed $v_r$.

The relationship: $v_r = \dot{r}_B - v_w$ advantageously applies in this case, where: $v_r := (v_{r,x}, v_{r,y}, v_{r,z})^T :=$ relative speed of the multicopter in relation to the air, and $v_w := (v_{w,x}, v_{w,y}, v_{w,z})^T$ is the wind speed.

The proposed multicopter thus solely uses the approach disclosed in the article indicated at the outset to determine the horizontal components $(v_{r,x}, v_{r,y})$ of the relative speed $v_r$, in which, based on a model of the dynamics of the multicopter and an estimation generated thereby of a force wrench $\tau_e$ acting externally on the multicopter, an estimation of the relative speed $v_r$ is performed.

The determination of the vertical component $(v_{r,z})$ of the relative speed $v_r$ is performed in the present case on the basis of the determination of the aerodynamic power of the respective motor-propeller combinations and also on the basis of the previously determined horizontal components $(v_{r,x}, v_{r,y})$ of the relative speed $v_r$.

The proposed multicopter thus enables a more accurate and robust determination of wind speeds during flight. It can therefore be used, in particular, as a flying wind sensor, which stores the determined wind data on board and/or transmits them to a ground station.

Several relationships and mathematical principles are described hereafter, which are used for the explanation and the implementation of the invention.

I. Movement Equations (Rigid-Body Mechanics)

The movement equations applicable to the present multicopter can fundamentally be formulated as follows:

$$m\ddot{r} = mge_3 + Rf + Rf_e, \qquad \text{(Eq. 1)}$$

$$I\dot{\omega} = (I\omega) \times \omega - mg(r_g) \times R^T e_3 + \overline{m} + \overline{m}_e, \text{ and} \qquad \text{(Eq. 2)}$$

$$\dot{R} = R(\omega) \times \qquad \text{(Eq. 3)}$$

where:
m: mass of the multicopter,
$r_B = (x,y,z)^T$: position of the multicopter in a fixed north-east-bottom inertial system,
$R \in SO(3)$: rotation matrix from a multicopter reference system to the inertial system,
$I \in \mathbb{R}^{3 \times 3}$: moment of inertia of the multicopter,
(•)x: skew symmetric matrix operator,
g: acceleration of gravity,
ω: angular speed of the multicopter,
$e_3$: unity vector of the z axis in the inertial system,
$r_g$: position of the mass center of gravity of the multicopter in the multicopter reference system, f: target force in the multicopter reference system,
$f_e$: external force acting on the multicopter in the multicopter reference system,
$\overline{m}$: target torque in the multicopter reference system, and
$\overline{m}_e$: effective torque acting externally on the multicopter in the multicopter reference system.

In this case, there are the target force wrench $\tau = [f^T, \overline{m}^T]^T$ generated by the propeller electric motor units and the force wrench $\tau_e = [f_e^T, \overline{m}_e^T]^T$ acting externally on the multicopter. In general, $\tau = [f^T, \overline{m}^T]^T$ is dependent on the free flow speed $v_\infty$ and the propeller speed $\overline{\omega}$. The term "free flow speed" $v_\infty$ is understood in the present case as the speed of an airflow which is uninfluenced by the multicopter.

II. Estimation of the External Force Wrench

The estimation of the force wrench $\tau_e = [f_e^T, \overline{m}_e^T]^T$ acting externally on the multicopter is advantageously performed on the basis of the following relationships:

$$\hat{\tau}_e = \begin{bmatrix} \int_0^t K_I^f (ma - f - \hat{f}_e) dt \\ K_I^m (I\omega - \int_0^t (m + (I\omega) \times \omega - mg(r_g) \times R^T e_3 + \hat{\overline{m}}_e) dt \end{bmatrix} \qquad \text{(Eq. 4)}$$

where:
$K_I^f$ and $K_I^m$: amplification factors of filters,
$a = R^T(\ddot{r} - ge_3)$: acceleration measured in the reference system of the multicopter, and
$\hat{f}_e$ and $\hat{\overline{m}}_e$: estimated external force or external torque, respectively, acting on the multicopter.

More detailed statements in this regard result, for example, from the article by Tomic T., "Evaluation of acceleration-based disturbance observation for multicopter control" in European Control Conference (ECC), 2014, pages 2937-2944.

III. Propeller Aerodynamics

The forces acting on a propeller of the multicopter are dependent on the free flow speed $v_\infty$ (relative wind speed). The free flow speed $v_\infty$ of the n-th propeller in a reference system of the propeller can be expressed as follows:

$$v_\infty^{(n)} = R_{pb}^{(n)} (R_{bi}^{(n)} v_r + \omega \times r_n) \qquad \text{(Eq. 5)}$$

wherein $v_r = \dot{r}_B - v_w$ is the true airspeed of the multicopter, $v_w$ is the wind speed, $R_{bi}^{(n)}$ is the rotation matrix from the inertial system to the reference system of the multicopter, $R_{pb}^{(n)}$ is the rotation matrix from the reference system of the multicopter to the reference system of the propeller, ω is the angular speed of the multicopter, and $r_n$ is the position of the respective propeller in relation to the reference system of the multicopter. On the basis of preservation of momentum, the following results for the thrust T generated by the n-th propeller $$T = 2\rho A v_i U \qquad \text{(Eq. 6)}$$

where: $\rho :=$ air density, $A :=$ area swept by the propeller, and $U = \|v_i e_3 + v_\infty\|$ is the total wake flow generated by the propeller. The flow speed $v_i$ induced by the propeller can advantageously be determined as follows:

$$v_i = v_h^2 / \sqrt{v_{xy}^2 + (v_i - v_z)^2}. \qquad \text{(Eq. 7)}$$

The solution is advantageously performed by means of a Newton-Raphson method in a few steps with known $v_h$ and $v_\infty$. For the horizontal and the vertical component of the free flow speed, the following applies: $v_{xy} = v_\infty - v_z$ and $v_z = e_3^T v_\infty$. In hovering flight, the following applies for the induced speed: $v_i=v_h=\sqrt{T_h/2\rho A}$, wherein the hovering flight thrust $T_h$ results from $T_h=\rho D^4 C_T \bar{\omega}^2$. The thrust coefficient $C_T$ is advantageously determined from static thrust measurements. D indicates the diameter of the respective propeller and $\bar{\omega}$ indicates the propeller rotational speed. The ideal aerodynamic propeller power is given by:

$$P_a = 2\rho A v_i U(v_i - v_z). \quad \text{(Eq. 8)}$$

The aerodynamic power in forward flight in relation to the hovering flight power is:

$$P_a/P_h = (v_i - v_z)/v_h \quad \text{(Eq. 9)}$$

given by $P_h = 2\rho A v_h^3$. Deviations from the ideal behavior can be taken into consideration by introducing a factor FM between 0 and 1. The relationship between aerodynamic power $P_a$ of a drive unit (electric motor and propeller) and the motor power $P_M$ generated by an electric motor results in this case as: $P_a = P_M \cdot \text{FM}$.

IV. Model for Describing a Brushless DC Electric Motor

The following motor dynamic model (M2) is advantageously used to estimate the aerodynamic power of a drive unit.

$$\tau_m = (K_{q0} - K_{q1} i_a) i_a \quad \text{(Eq. 10)}$$

$$I_r \dot{\omega}_E = \tau_m - D_r \quad \text{(Eq. 11)}$$

where: $i_a$:=motor current, $\bar{\omega}_E$:=angular speed of the electric motor, $\tau_m$:=torque of the electric motor, wherein the torque factor $K_q(i_a)$ is advantageously modeled as follows: $K_q(i_a) = (K_{q0} - K_{q1} i_a)$ with the constants: $K_{q0}$, $K_{q1}$. $I_r$ is the moment of inertia of the electric motor and $D_r$ is the aerodynamic moment of friction which acts on the motor. The total mechanical power output by the electric motor results as: $P_m = P_a/\text{FM} + P_r$, where $P_m$:=mechanical power of the electric motor and $P_r$:=power which is required to accelerate the electric motor rotor, is advantageously used to determine an estimation of the aerodynamic power $P_a$ as follows:

$$P_m = \tau_m \bar{\omega}_E = (K_{q0} - K_{q1} i_a) i_a \bar{\omega}_E, \quad \text{(Eq. 12)}$$

$$P_r = I_r \bar{\omega}_E \dot{\bar{\omega}}_E, \text{ and} \quad \text{(Eq. 13)}$$

$$P_a = \text{FM}((K_{q0} - K_{q1} i_a) i_a - I_r \dot{\bar{\omega}}_E) \bar{\omega}_E. \quad \text{(Eq. 14)}$$

In summary, this means that the motor current $i_a$ is measured or estimated. The variables $\bar{\omega}_E$ and $\dot{\bar{\omega}}_E$ can also be measured or estimated in dependence on $i_a$.

V. Estimation of the Wind Speed $v_w$ Based on the Determination of an External Force Wrench $\tau_e$ As stated in the article mentioned at the outset, the wind speed can be determined based on the force wrench $\tau_e$ acting externally on the multicopter. It is assumed in this case that the force wrench $\tau_e$ may be attributed exclusively to aerodynamic $\tau_d$ friction forces: $\tau_e = \tau_d$, so that the fundamental aerodynamic model M1 merely has to be inverted: $\tau_d = d(v_r)$. For simple aerodynamic models, this can be performed via a simple relation or iteration. If one uses, for example, a linear model M1 as a basis, the following thus applies, for example:

$$d(v_r) = D_l v_r \Sigma \bar{\omega}^{(n)} \quad \text{(Eq. 15)}$$

where $D_l$:=linear coefficient matrix. If $\hat{f}_e = d(v_r)$ is used, the following results:

$$v_r(d) = \frac{1}{\Sigma \bar{\omega}_i} D \hat{f}_e \quad \text{(Eq. 16)}$$

where: D:=a coefficient matrix. This simple model furthermore implies that the multicopter has a symmetrical shape.

Alternatively, a learning-based approach can be followed. The above relation can also be modeled by means of a radial basis function (RBF) neuronal network. This has the advantage that the inverse relation is coded directly in the radial basis function. The relation $v_r = d^{-1}(\tau_e)$ is advantageously modeled as a normalized RBF network having K base functions:

$$v_r = \frac{1}{\varphi_\Sigma} W \varphi(\tau_e) \quad \text{(Eq. 17)}$$

where: $W \in \mathfrak{R}^{3 \times K}$=matrix having weighting constants of the RBFs for each speed component:

$$W = \begin{bmatrix} w_x^T \\ w_y^T \\ w_z^T \end{bmatrix} = \begin{bmatrix} w_{x,1} & \cdots & w_{x,K} \\ w_{y,1} & \cdots & w_{y,K} \\ w_{z,1} & \cdots & w_{z,K} \end{bmatrix} \quad \text{(Eq. 18)}$$

and where: $\varphi = [\varphi(r_1), \ldots, \varphi(r_K)]^T$ of the evaluated base functions. The network is advantageously normalized by the factor: $\varphi_\Sigma = \Sigma_{i=1}^K \varphi(r_i)$. Gaussian base functions are advantageously used:

$$\varphi(r_i) = \exp\left(-\frac{1}{\sigma^2} \|x - c_i\|^2\right) \quad \text{(Eq. 19)}$$

where $\sigma$:=form parameter, x:=the determined vector, and $c_i$:=the center of the i-th base function.

VI. Wind Measurements on the Basis of Determined Aerodynamic Powers of the Drive Units Each Consisting of Propeller and Electric Motor Proceeding from the equations (Eq. 7), (Eq. 8), and (Eq. 9), the aerodynamics for a propeller can be formulated as a system of nonlinear equations $F(v_{r,z}, v_{r,xy}, v_i, v_h, P_a) = 0$ and $F = [F_1, F_2, F_3]^T$, where:

$$F_1 = v_i^4 - 2 v_i^3 v_{r,z} + v_i^2 (v_{r,xy}^2 + v_{r,z}^2) - v_h^4 = 0,$$

$$F_2 = v_i U(v_i - v_{r,z}) - P_a/(2\rho A_2) = 0, \text{ and}$$

$$F_3 = v_h^2 (v_i - v_{r,z}) - P_a/(2\rho A_n) = 0. \quad \text{(Eq. 21)}$$

It is presumed that $P_a/(2\rho A)$ and $v_h$ are known and the vector $x = [v_{r,x}, v_{r,y}, v_{r,z}, v_i]^T$ is to be determined. The above-mentioned system of nonlinear equations (Eq. 21) is under-determined, since three unknown and only two known variables are present (in this case, the horizontal components $v_{r,x}$ and $v_{r,y}$ are coupled in $v_{r,xy}$. A plurality of solutions of the equation system (Eq. 21) thus results. To solve this minimization problem, it is proposed that the system of the equations (Eq. 21) be expanded in such a way that a plurality (number K) of "measurements" of $P_a$ is integrated into the equation system.

Overall, K measurements are thus carried out to determine the aerodynamic power $P_{a,n}$. The aerodynamic power $P_{a,n}$ can be produced in this case, for example, K times for a single electric motor and its propeller. Advantageously, the K "measurements" of the aerodynamic power $P_{a,n}$ are performed for two or more different electric motors and the propellers thereof. Finally, for the K different measurements, a transformation of the equation system (Eq. 21) into a common reference system is performed. This fundamentally enables the estimation of all three components of the relative wind direction and the wind speed $v_i$ induced by the propeller by solving the nonlinear quadratic minimization problem (Eq. 21).

It is presumed in this case that during the K "measurements" of the aerodynamic power $P_a$, the wind speed $v_w = [v_{w,x}, v_{w,y}, v_{w,z}]$ remains equal. If the K measurements are carried out in a sufficiently short time, this assumption is thus adequately justified. Sufficiently accurate wind measurements require K determinations of the aerodynamic power, wherein it is sufficient to select K advantageously ≤10, or K advantageously in the range of 3 to 8. The higher K is selected, the greater is the computing effort and accompanying this also the period of time in which measurements are carried out, so that as a period of time becomes longer, the probability of a variation of the wind in the period of time rises.

Advantageously, N measurements or determinations of the aerodynamic power $P_a$ are carried out simultaneously on the K electric motor propeller units. If, for example, K=8 is selected and the multicopter has four drive units, only two successive "measurements" of the aerodynamic power $P_a$ are thus required per drive unit. "Measurements" of the aerodynamic power $P_a$ from a variety of poses of the multicopter at different points in time in a small time window can advantageously be combined. If the flight of the multicopter is not aggressive, i.e., the orientation of the multicopter does not change significantly in the measuring period of time, the free flow speed $v_\infty$ in the reference system of the multicopter can thus be estimated sufficiently accurately. Overall, K "measurements" of the aerodynamic power $P_a$ are thus carried out to determine the vertical component $[v_{w,z}]$ of the wind direction $v_w$.

The state vector x to be determined for K measurements is:

$$x = [v_{r,x}, v_{r,y}, v_{r,z}, v_{i,1}, v_{i,2}, \ldots, v_{i,K}]^T \quad \text{(Eq. 22)}$$

wherein the expanded equation system has to be solved:

$$F(v_{r,x}, v_{r,y}, v_{r,z}, v_{i,1}, v_{h,1}, P_{a,1}, \ldots v_{i,K}, v_{h,K}, P_{a,K}) = 0$$

$$F = [F_{1,1}, F_{2,1}, F_{3,1}, \ldots, F_{1,K}, F_{2,K}, F_{3,K}]^T \quad \text{(Eq. 23)}$$

wherein $F_{1,k}$, $F_{2,k}$, $F_{3,k}$ are evaluations of the equation system (Eq. 21) for the k-th "measurement" of the aerodynamic powers. To solve the equation (Eq. 23), a Jacobian matrix is required. The Jacobian matrix for the k-th measurement results as:

$$\mathfrak{J}^{(k)} = \begin{bmatrix} J_{11}^{(k)} & J_{12}^{(k)} & J_{13}^{(k)} & J_{14}^{(k)} \\ J_{21}^{(k)} & J_{22}^{(k)} & J_{23}^{(k)} & J_{24}^{(k)} \\ J_{31}^{(k)} & J_{32}^{(k)} & J_{33}^{(k)} & J_{34}^{(k)} \end{bmatrix} \quad \text{(Eq. 24)}$$

where: $J_{ij}^{(k)} = \partial F_{i,k} / \partial x_{j,k}$. The expanded Jacobian matrix $\mathfrak{J} \in \mathfrak{R}^{3K \times K+3}$ can thus now be constructed. In the example case of three measurements (K=3), the following results: $x|_{N=3} = [v_{r,x}, v_{r,y}, v_{r,z}, v_{i,1}, v_{i,2}, v_{i,3}]^T$ and $$\mathfrak{J}|_{N=3} = \begin{bmatrix} J_{11}^{(1)} & J_{12}^{(1)} & J_{13}^{(1)} & J_{14}^{(1)} & 0 & 0 \\ J_{21}^{(1)} & J_{22}^{(1)} & J_{23}^{(1)} & J_{24}^{(1)} & 0 & 0 \\ J_{31}^{(1)} & J_{32}^{(1)} & J_{33}^{(1)} & J_{34}^{(1)} & 0 & 0 \\ J_{11}^{(2)} & J_{12}^{(2)} & J_{13}^{(2)} & 0 & J_{14}^{(2)} & 0 \\ J_{21}^{(2)} & J_{22}^{(2)} & J_{23}^{(2)} & 0 & J_{24}^{(2)} & 0 \\ J_{31}^{(2)} & J_{32}^{(2)} & J_{33}^{(2)} & 0 & J_{34}^{(2)} & 0 \\ J_{11}^{(3)} & J_{12}^{(3)} & J_{13}^{(3)} & 0 & 0 & J_{14}^{(3)} \\ J_{21}^{(3)} & J_{22}^{(3)} & J_{23}^{(3)} & 0 & 0 & J_{24}^{(3)} \\ J_{31}^{(3)} & J_{32}^{(3)} & J_{33}^{(3)} & 0 & 0 & J_{34}^{(3)} \end{bmatrix}.$$

An expansion to K measurements is easily possible for a person skilled in the art. If measurements from various poses of the multicopter are combined, the wind speeds resulting in each case have to be transformed into a common reference system.

The free flow speed for the n-th propeller is advantageously defined as follows:

$$v_\infty^{(n)} = \begin{bmatrix} v_{\infty,x}^{(n)} \\ v_{\infty,y}^{(n)} \\ v_{\infty,z}^{(n)} \end{bmatrix} = R^{(n)} \begin{bmatrix} v_{\infty,x} \\ v_{\infty,y} \\ v_{\infty,z} \end{bmatrix} + v_0^{(n)} \quad \text{(Eq. 25)}$$

wherein the transformed speeds are used to compute equations (Eq. 21) and (Eq. 24). The offset speed $v_0^{(n)}$ can be obtained from a pose estimation system as the difference speed between two measurements. The offset speed of the propeller on the basis of an angular speed of the multicopter can advantageously also be used, for example, $v_0^{(n)} = R_{pb}^{(n)} \omega \times r_n$. The rotation matrix $R^{(n)}$ transforms the relative speed from the common coordinate system into the propeller coordinate system. This formulation advantageously enables the independent determination of all three components of the free flow speed. Furthermore, it also permits the determination of the wind components $v_w$ for the case in which the propellers are not arranged in a coplanar configuration on the multicopter.

If the equations "match", a multidimensional optimization problem is to be solved. The solution is then in the intersection of all nonlinear functions for which the following applies: F=0. In the general case, however, an intersection does not result for all nonlinear functions. In this case, a nonlinear quadratic minimization problem has to be solved using the following objective function:

$$\bar{j} = \tfrac{1}{2} F^T F. \quad \text{(Eq. 26)}$$

This is advantageously performed using a Levenberg-Marquard method. If an exact solution exists, $\bar{j}=0$ applies, i.e., the intersection of F=0. In all other cases, a quadratic minimized solution results.

The solution space of the equation (Eq. 26) contains local optima. Based on the fundamental physics, the same measured aerodynamic powers $P_a$ can occur at different wind speeds $v_w$ and induced speeds $v_i$. The optimized variables are speeds. It is therefore advisable to use physical considerations as the foundation, to differentiate reasonable solutions from nonsensical solutions. A multicopter has to use power to generate thrust, which means T>0 and $P_a$>0. The induced speed $v_i$ is less than the hovering flight speed $v_h$. The induced speed is advantageously restricted to a range $0 < v_i < v_h$.

One advantageous refinement of the multicopter is distinguished in that the second unit is embodied and configured for the purpose of solving the following quadratic minimization problem or one which is transferable thereto or is equivalent in its basic concepts for a number of a total of K measurements of the aerodynamic power $P_{a,n}$ for f, where k=1, ..., K and K≥1:

$$\tilde{J} = \tfrac{1}{2} F^T F \quad (1)$$

wherein the following applies:

$$F(v_{r,x}, v_{r,y}, v_{r,z}, v_{i,1}, v_{h,1}, P_{a,1}, \ldots, v_{i,K}, v_{h,K}, P_{a,K}) = 0, \quad (2)$$

$$F = [F_{1,1}, F_{2,1}, F_{3,1}, \ldots, F_{1,K}, F_{2,K}, F_{3,K}], \quad (3)$$

$$F_{1,k} = v_{i,k}^4 - 2 v_{i,k}^3 v_{r,z} + v_{i,k}^2 (v_{r,x}^2 + v_{r,y}^2 + v_{r,z}^2) - v_{h,k}^4 = 0, \quad (4)$$

$$F_{2,k} = v_{i,k} U_k (v_{i,k} - v_{r,z}) - P_{a,k}/(2 \rho A_n) = 0, \quad (5)$$

$$F_{3,k} = v_{h,k}^2 (v_{i,k} - v_{r,z}) - P_{a,k}/(2 \rho A_n) = 0, \text{ and} \quad (6)$$

$$U_k = \sqrt{v_{r,x}^2 + v_{r,y}^2 + (v_{i,k} - v_{r,z})^2} \quad (7)$$

where
$A_n$: area swept by the n-th propeller,
$\rho$: air density,
$v_{h,k}(P_{a,n,k})$: induced speed of the n-th propeller in hovering flight for the k-th measurement, and
$v_{i,k}(P_{a,n,k})$: speed induced by the n-th propeller for the k-th measurement.

Above equations (1) to (7) are described in the respective propeller coordinate system.

One advantageous refinement of the multicopter is distinguished in that the second unit is embodied and configured in such a way that the horizontal components ($v_{r,x}$, $v_{r,y}$) of the relative speed $v_r$ determined by the first unit are taken into consideration in the nonlinear quadratic minimization problem by the following relationships or relationships transferable thereto:

$$F_{4,k} = v_{r,x,k} - v_{r,x} = 0 \text{ and} \quad (9)$$

$$F_{5,k} = v_{r,y,k} - v_{r,y} = 0. \quad (10)$$

The equations (9) and (10) are described in the respective propeller coordinate system. Therefore, the speed estimated according to present claim 1 can be projected in the propeller coordinate system, so that these equations apply.

An advantageous refinement of the multicopter is distinguished in that the model M1 is based on the following movement equation or the model M1 can be traced back to the following movement equation:

$$M\dot{v} + C(v)v + g_M = J^T \tau + \tau_e$$

wherein the following applies: $\tau_e = \tau_d(v_r)$ and $v_r = \dot{r}_B - v_w$,
where
M: generalized mass of the multicopter,
v: generalized speed $[\dot{r}_b^T, \omega^T]$,
$\omega$: angular speed of the multicopter,
$\dot{v}$: time derivative of v, $$C(v) := \begin{bmatrix} 0_{3\times 3} & 0_{3\times 3} \\ 0_{3\times 3} & -(I\omega) \times \end{bmatrix},$$

$g_M$: weight of the multicopter,
J: block diagonals of the Jacobian matrix,
$\tau$: target force wrench $[f^T, \overline{m}^T]$ to be generated by the electric motors $MOT_n$, $\tau_e$: force wrench $[f_e^T, \overline{m}_e^T]$ acting externally on the multicopter,
$\tau_d(v_r)$: external force wrench generated exclusively by air friction,
$v_r$: $(v_{r,x}, v_{r,y}, v_{r,z})^T$ relative speed of the multicopter in relation to the air, and
$v_w$: $=(v_{w,x}, v_{w,y}, v_{w,z})^T$ wind speed.

One advantageous refinement of the multicopter is distinguished in that a control system is provided for controlling and regulating the electric motors $MOT_n$, wherein the control system is embodied and configured in such a way that the electric motors $MOT_n$ are regulated in such a way that the projection of the determined wind speed $v_w$ on the direction of axis of rotation of the propellers $PROP_n$ is maximized.

The fundamental optimization problem can also be mathematically formulated. For this purpose, an orientation o* has to be determined which minimizes the condition number of the Jacobian matrix, by o*=argmin K(J), wherein K is the condition number.

Trajectory planning can advantageously be used for this purpose in particular and/or the control of the multicopter can be adapted to the optimal wind estimation. The solution can also be generated by gradient methods, potential-based methods, or other equivalent mathematical solutions.

The accuracy of the wind measurement is enhanced and the robustness of the measurement is improved by this measure.

A 3D acceleration sensor and a gyroscope and also a position determination system are advantageously provided in the multicopter and are connected to the first interface for determining the first parameters P1. The position determination system is advantageously a satellite navigation system and/or an optical navigation system.

One advantageous refinement of the multicopter is distinguished in that for the determination of the aerodynamic power $P_{a,n}$ per electric motor $MOT_n$, a motor current sensor, a motor rotational speed sensor, or a motor rotational speed estimator are provided, and also a unit which determines the aerodynamic power $P_{a,n}$ on the basis of a predetermined model M2 for describing the propeller dynamic range, the detected motor currents, and motor rotational speeds. At least one corresponding model M2 was already explained above.

A further aspect of the invention relates to methods for measuring a wind speed $v_w$ using a multicopter, wherein the multicopter has a number N of electric motors $MOT_n$ for driving N propellers $PROP_n$, where n=1, 2, ..., N and N≥2, including the following steps: providing first parameters P1 including: a 3D position $r_B = (x_b, y_b, z_b)$ of the center of gravity B of the multicopter, the time derivatives: $\dot{r}_B$ and $\ddot{r}_B$, a 3D orientation $o_M = (\alpha_M, \beta_M, \gamma_M)$ of the multicopter and its time derivative $\dot{o}_M$, providing an aerodynamic power $P_{a,n}$ currently generated by the respective propellers $PROP_n$ on the basis of the first parameters P1 and/or the aerodynamic power $P_{a,n}$ and/or an estimation of one or more force wrenches $\tau_e$ acting externally on the multicopter, determining a relative speed $v_r := (v_{r,x}, v_{r,y}, v_{r,z})^T$ of the multicopter in relation to the air on the basis of the determined relative speed $v_r := (v_{r,x}, v_{r,y}, v_{r,z})^T$ and on the basis of the parameters P1, determining the wind speed $v_w$ in an inertial system, and storing the wind speeds $v_w(r_B) = (v_{w,x}(r_B), v_{w,y}(r_B), v_{w,z}(r_B))$ determined for the locations $r_B$, and/or transmitting the wind speed $v_w(r_B)$ to a receiver.

A further aspect of the present invention relates to a method for measuring a wind speed $v_w$ using a multicopter, wherein the multicopter has a number N of electric motors MOT$_n$ for driving N propellers PROP$_n$, where n=1, 2, . . . , N and N≥2 including the following steps.

In one step, a provision of first time-dependent parameters P1 is performed, including a 3D position $r_B=(x_b, y_b, z_b)$ of the center of gravity B of the multicopter (or providing pieces of information from which the position $r_B=(x_b, y_b, z_b)$ of the center of gravity B of the multicopter can be determined/estimated), the time derivatives: $\dot{r}_B$ and $\ddot{r}_B$, a 3D orientation $o_M=(\alpha_M, \beta_M, \gamma_M)$ of the multicopter and the time derivative $\dot{o}_M$ (the variables $\dot{r}_B$, $\ddot{r}_B$, $o_M=(\alpha_M, \beta_M, \gamma_M)$, $\dot{o}_M$ are advantageously measured (for example, by means of GPS, LIDAR, cameras, etc., one or more inertial measuring units (IMU)) etc., observed or derived (for example, by visual odometry, sensor data fusion such as Kalman filters etc.). In a further step, a provision of an aerodynamic power $P_{a,n}$ generated by the respective propellers PROP$_n$ is performed (which is advantageously measured or observed). In a further step, on the basis of the first parameters P1 and/or a provided model M1 for describing dynamics of the multicopter and/or an estimation determined on the basis of the model M1 of one or more force wrenches $\tau_e$ acting externally on the multicopter, a determination is performed of horizontal components ($v_{r,x}$, $v_{r,y}$) of a relative speed $v_r$ of the multicopter in relation to the air (for this purpose functional approximators are advantageously used, which are known from the field of "machine learning", for example, linear regression, neuronal networks, multilayer perceptrons, deep neuronal networks, convolution networks, recurrent networks, for example, LSTM networks, support vector machines (SVM) etc.). In a further step, on the basis of the determined horizontal components ($v_{r,x}$, $v_{r,y}$) and the aerodynamic power $P_{a,n}$, a determination is performed of the vertical component ($v_{r,z}$) of the relative speed $v_r$. In a further step, on the basis of the determined relative speed $v_r=(v_{r,x}, v_{r,y}, v_{r,z})$ and on the basis of the parameters P1, a determination is performed of the wind speed $v_w$ in an inertial system. Finally, storage is performed of the wind speed determined for $r_B$: $v_w(r_B)=(v_{w,x}(r_B), v_{w,y}(r_B), v_{w,z}(r_B))$ and/or transmission of the wind speed: $v_w(r_B)=(v_{w,x}(r_B), v_{w,y}(r_B), v_{w,z}(r_B))$ to a receiver.

The horizontal components ($v_{r,x}, v_{r,y}$) are thus determined by measuring the force wrench acting externally on the multicopter using the equations (Eq. 16) and (Eq. 17). Based on the determined horizontal components ($v_{r,x}, v_{r,y}$) and a determined aerodynamic power $P_a$, the vertical component ($v_{r,z}$) is determined.

Finally, the three-dimensional wind speed can be determined, stored, transmitted, and possibly subsequently output by way of the relationship $v_r=\dot{r}_B-v_w$.

One advantageous refinement of the proposed method is distinguished in that the following nonlinear quadratic minimization problem or one transferable thereto is solved for a number of a total of K measurements of the aerodynamic power $P_{a,n}$ for f, where k=1, 2, . . . , K and K≥1:

$$\tilde{J}=\tfrac{1}{2}F^T F \quad (1)$$

wherein the following applies:

$$F(v_{r,x},v_{r,y},v_{r,z},v_{i,1},v_{h,1},P_{a,1}, \ldots ,v_{i,K},v_{h,K},P_{a,K})=0, \quad (2)$$

$$F=[F_{1,1},F_{2,1},F_{3,1}, \ldots ,F_{1,K},F_{2,K},F_{3,K}], \quad (3)$$

$$F_{1,k}=v_{i,k}^4-2v_{i,k}^3 v_{r,z}+v_{i,k}^2(v_{r,x}^2+v_{r,y}^2+v_{r,z}^2)-v_{h,k}^4=0, \quad (4)$$

$$F_{2,k}=v_{i,k}U_k(v_{i,k}-v_{r,z})-P_{a,k}/(2\rho A_n)=0, \quad (5)$$

$$F_{3,k}=v_{h,k}^2(v_{i,k}-v_{r,z})-P_{a,k}/(2\rho A_n)=0, \text{ and} \quad (6)$$

$$U_k=\sqrt{v_{r,x}^2+v_{r,y}^2+(v_{i,k}-v_{r,z})^2} \quad (7)$$

where $A_n$: area swept by the n-th propeller, $\rho$: air density, $v_{h,k}(P_{a,n,k})$: induced speed of the n-th propeller in hovering flight for the k-th measurement, and $v_{i,k}(P_{a,n,k})$: speed induced by the n-th propeller for the k-th measurement.

Above equations (1) to (7) are described in the respective propeller coordinate system.

One advantageous refinement of the proposed method is distinguished in that the determined horizontal components ($v_{r,x}$, $v_{r,y}$) are taken into consideration in the nonlinear quadratic minimization problem by the following relationships or relationships transferable thereto:

$$F_{4,k}=v_{r,x,k}-v_{r,x}=0 \text{ and} \quad (9)$$

$$F_{5,k}=v_{r,y,k}-v_{r,y}=0. \quad (10)$$

Equations (9) and (10) are described in the respective propeller coordinate system. Therefore, the speed estimated according to present claim 1 can be projected into the propeller coordinate system so that these equations apply.

One advantageous refinement of the proposed method is distinguished in that the model M1 is based on the following movement equation or the model M1 can be traced back to the following movement equation:

$$M\dot{v}+C(v)v+g_M=J^T\tau+\tau_e$$

wherein the following applies: $\tau_e=\tau_d(v_r)$ and $v_r=\dot{r}_B-v_w$, where M: generalized mass of the multicopter, v: generalized speed $[\dot{r}_b^T, \omega^T]$, $\omega$: angular speed of the multicopter, $\dot{v}$: time derivative of v, $$C(v): = \begin{bmatrix} 0_{3\times 3} & 0_{3\times 3} \\ 0_{3\times 3} & -(I\omega)\times \end{bmatrix},$$

$g_M$: weight of the multicopter,

J: block diagonals of Jacobian matrix, $\tau$: target force wrench $[f^T, \overline{m}^T]$ to be generated by the electric motors MOT$_n$, $\tau_e$: force wrench $[f_e^T, \overline{m}_e^T]$ acting externally on the multicopter, $\tau_d(v_r)$: external force wrench generated exclusively by air friction, $v_r: =(v_{r,x}, v_{r,y}, v_{r,z})^T$ relative speed of the multicopter in relation to the air, and $v_w: =(v_{w,x}, v_{w,y}, v_{w,z})^T$ wind speed.

One advantageous refinement of the proposed method is distinguished in that a control system is provided for controlling and regulating the electric motors MOT$_n$, wherein the electric motors MOT$_n$ are regulated in such a way that the projection of the wind speed $v_w$ on the direction of the axis of rotation of the propellers is maximized.

One advantageous refinement of the proposed method is distinguished in that for the determination of the aerodynamic power $P_{a,n}$ per electric motor MOT$_n$, a motor current and a motor rotational speed are determined, and, on the basis of a predetermined model M2 for describing the propeller dynamic range, the detected motor currents, and motor rotational speeds, the aerodynamic power $P_{a,n}$ is determined.

One advantageous refinement of the proposed method is distinguished in that the determination of the horizontal components ($v_{r,x}$, $v_{r,y}$) is performed by means of a model of the aerodynamic force wrench, which describes the dependence $v_r(\tau_e)$.

One advantageous refinement of the proposed method is distinguished in that the nonlinear quadratic minimization problem is solved by means of a nonlinear optimization method (for example, Levenberg-Marquardt).

A further aspect of the invention relates to a computer system having a data processing device, wherein the data processing device is designed in such a way that a method as described above is executed on the data processing device.

A further aspect of the invention relates to a digital storage medium having electronically readable control signals, wherein the control signals can interact with a programmable computer system so that a method as described above is executed.

A further aspect of the invention relates to a computer program product having program code stored on a machine-readable carrier for carrying out the method as described above with the program code executed on a data processing device.

A further aspect of the invention relates to a computer program having program code for carrying out the method as described above when the program runs on a data processing device. For this purpose, the data processing device can be designed as an arbitrary computer system known from the prior art.

A further aspect of the invention relates to a system including two or more multicopters as described above, wherein the multicopters are each also embodied and configured for bilateral data exchange with one another in a data network and the multicopters transmit the respective determined wind speed: $v_w(r_B)=(v_{w,x}(r_B), v_{w,y}(r_B), v_{w,z}(r_B))$ to the respective other multicopter. The data exchange preferably takes place via radio and/or optical data transmission.

The multicopters are advantageously embodied as agents or softbots for wireless communication in the data network. The term "agent" is used in the present case in the following meaning: "computer system which is located in a specific environment and is capable of carrying out independent actions in this environment to achieve its (predetermined) goals".

One advantageous refinement of the proposed method is distinguished in that the control system for controlling and regulating the electric motors $MOT_n$ of the respective multicopter is embodied and configured in such a way that determined wind speeds transmitted from the other multicopters: $v_w(r_B)=(v_{w,x}(r_B), v_{w,y}(r_B), v_{w,z}(r_B))$ are taken into consideration in the regulation and movement planning.

One advantageous refinement of the proposed method is distinguished in that the multicopters transmit the positions $r_B$ of the center of gravity B and/or the time derivatives: $\dot{r}_B$ and/or $\ddot{r}_B$ and/or the 3D orientation $o_m$ and/or its time derivative $\dot{o}_M$ of the respective multicopter and/or the force wrench $\tau_e$ acting externally on the respective multicopter and/or the aerodynamic power $P_{a,n}$ to the respective other multicopters.

One advantageous refinement of the proposed system is distinguished in that one or more multicopters and/or a control center, which is configured for the data exchange with the multicopters in the data network, is/are configured and embodied to solve an optimization problem according to the claims. This enables in particular the proposed system to be used as a distributed wind estimator, in which a corresponding equation system is prepared, which takes into consideration all or some of the multicopters (agents), and an optimization problem is solved, for example, as set forth in the present claims. The learning of the regression via the example above-mentioned methods can also be applied to the multicopter scenario.

Further advantages, features, and details result from the following description in which—possibly with reference to the drawings—at least one example embodiment is described in detail. Identical, similar, and/or functionally-identical parts are provided with identical reference signs.

DETAILED DESCRIPTION

Figure 1:
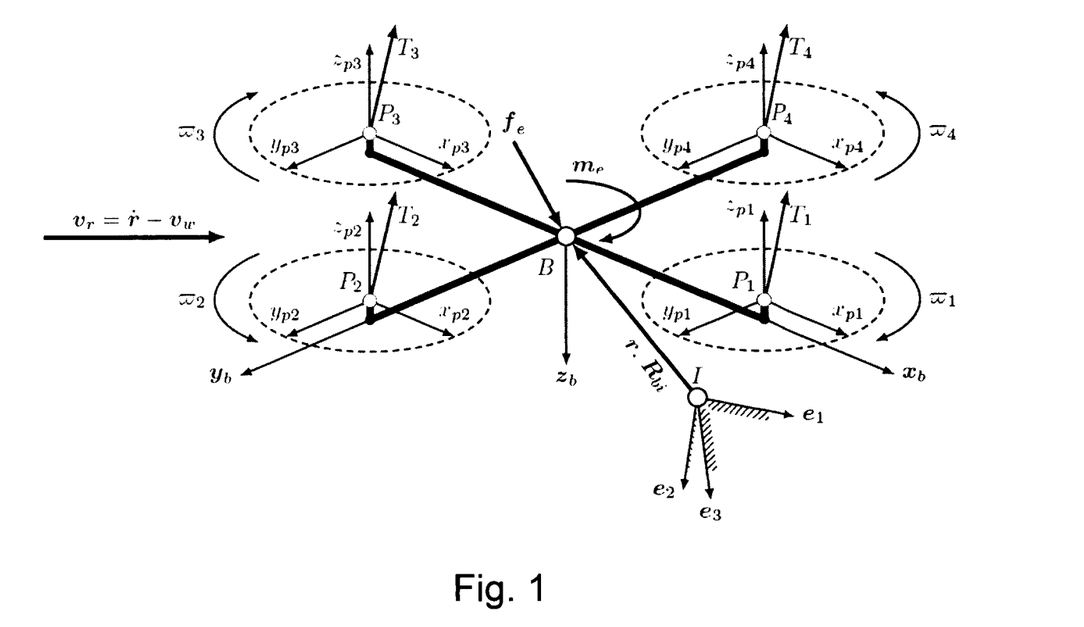
FIG. 1 shows a diagram to illustrate the variables used to describe the dynamics of the multicopter.

FIG. 1 shows a diagram to illustrate the variables and reference systems used to describe the dynamics of the multicopter. The reference system B of the multicopter is located at the position r having an orientation $\overline{R}$ in the inertial system I and is subjected to the wind speed $v_w$. This wind generates, due to aerodynamic forces in dependence on the relative speed $v_r$ of the multicopter in relation to the air, an external force wrench $\tau_e=[f_e^T, \overline{m}_e^T]^T$. The propellers rotate at an angular speed $\overline{\omega}=[\overline{\omega}_1, \overline{\omega}_2, \overline{\omega}_3, \overline{\omega}_4]^T$ and generate a target force wrench $\tau=[f^T, \overline{m}^T]^T$ due to the thrusts $T_i$ and friction torques $Q_i$. The other cumulative specifications are self-explanatory in conjunction with the above description.

Figure 2:
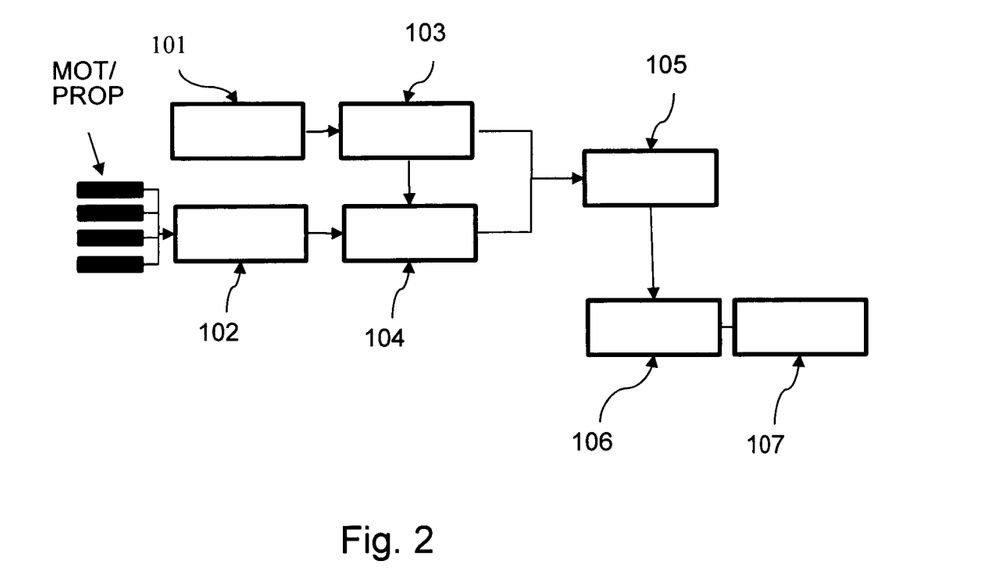
FIG. 2 shows a schematic illustration of the construction of a multicopter according to the invention.

FIG. 2 shows a schematic illustration of the construction of a multicopter according to the invention. In the present case, the multicopter includes a number N=4 electric motors $MOT_n$ for driving N=4 propellers $PROP_n$, a first interface 101 for providing first parameters P1 including: a 3D position $r_B=(x_b, y_b, z_b)$ of the center of gravity B of the multicopter, the time derivatives: $\dot{r}_B$ and $\ddot{r}_B$, a 3D orientation $o_M=(\alpha_M, \beta_M, \gamma_M)$ of the multicopter and its time derivative $\dot{o}_M$, a second interface 102 for providing an aerodynamic power $P_{a,n}$ currently generated by the respective propellers $PROP_n$, and a first unit 103, which, on the basis of the first parameters P1, on the basis of a provided model M1 for describing dynamics of the multicopter, and an estimation determined on the basis of the model M1 of a force wrench $\tau_e$ acting externally on the multicopter, determines horizontal components ($v_{r,x}$, $v_{r,y}$) of a relative speed $v_r:=(v_{r,x}, v_{r,y}, v_{r,z})^T$ of the multicopter in relation to the air.

The multicopter furthermore includes a second unit 104, which, on the basis of the determined horizontal components ($v_{r,x}$, $v_{r,y}$) and on the basis of the aerodynamic power $P_{a,n}$, determines the vertical component ($v_{r,z}$) of the relative speed $v_r$, a third unit 105, which, on the basis of the determined horizontal components ($v_{r,x}$, $v_{r,y}$), the vertical component ($v_{r,z}$), and on the basis of the parameters P1, determines the wind speed $n_w$ in an inertial system, a storage unit 106 for storing the wind speeds $v_w(\tau_B)=(v_{w,x}(r_B), v_{w,y}(r_B), v_{w,z}(r_B))$ determined for the locations $r_B$ and a transmission unit 107 for the wireless transmission of the wind speed $v_w(\tau_B)$ to a receiver (not shown).

Figure 3:
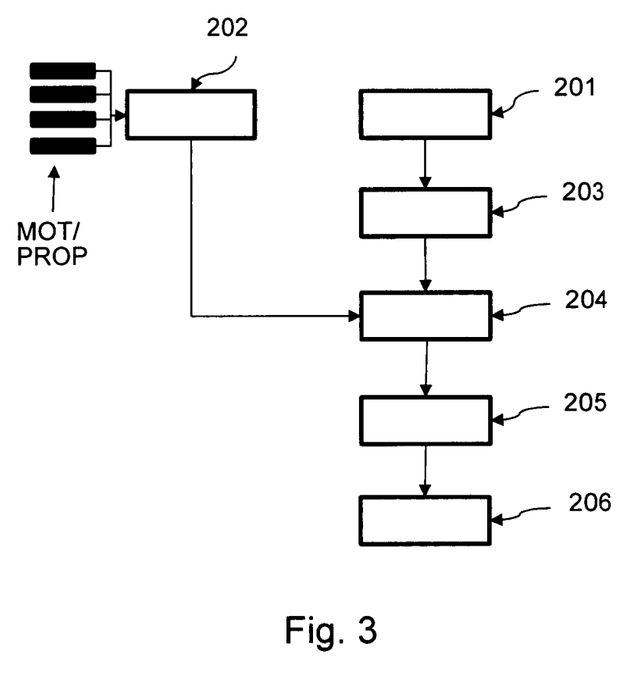
FIG. 3 shows a schematic illustration of a flow chart of a method according to the invention.

FIG. 3 shows a schematic illustration of a flow chart of a method according to the invention for measuring a wind speed $v_w$ using a multicopter, wherein the multicopter has a number N of electric motors $MOT_n$ for driving N propellers $PROP_n$, where n=1, 2, ..., N and N≥2. The method includes the following steps. In a step 201 a provision is performed of first time-dependent parameters P1 including a 3D position $r_B=(x_b, y_b, z_b)$ of the center of gravity B of the multicopter, the time derivatives: $\dot{r}_B$ and $\ddot{r}_B$, a 3D orientation $o_M=(\alpha_M, \beta_M, \gamma_M)$ of the multicopter, and the time derivative $\dot{o}_M$. In a further step 202, a provision is performed of an aerodynamic power $P_{a,n}$ generated by the respective propellers $PROP_n$. In a further step 203, on the basis of the first parameters P1, a provided model M1 for describing dynamics of the multicopter, and an estimation determined on the basis of the model M1 of a force wrench $\tau_e$ acting externally on the multicopter, a determination is performed of horizontal components $(v_{r,x}, v_{r,y})$ of a relative speed $v_r$ of the multicopter in relation to the air. In a further step 204, on the basis of the determined horizontal components $(v_{r,x}, v_{r,y})$ and the aerodynamic power $P_{a,n}$, a determination of the vertical component $(v_{r,z})$ of the relative speed $v_r$, on the basis of the determined relative speed $v_r=(v_{r,x}, v_{r,y}, v_{r,z})$ and on the basis of the parameters P1, a determination is performed of the wind speed $v_w$ in an inertial system. In a further step 205, a storage is performed of the wind speed: $v_w(r_B)=(v_{w,x}(r_B), v_{w,y}(r_B), v_{w,z}(r_B))$ determined for $r_B$. In a further step 206, a transmission is performed of the wind speed: $v_w(r_B)=(v_{w,x}(r_B), v_{w,y}(r_B), v_{w,z}(r_B))$ to a receiver.

Although the invention was illustrated and explained in greater detail by the preferred example embodiments, the invention is not thus restricted by the disclosed examples and other variations can be derived therefrom by a person skilled in the art without leaving the scope of protection of the invention. It is therefore clear that a variety of possible variations exists. It is also clear that embodiments mentioned by way of example actually only represent examples which are not to be interpreted in any way as a limitation of, for example, the scope of protection, the possible applications, or the configurations of the invention. Rather, the above description and the description of the figures make a person skilled in the art capable of implementing the example embodiments in concrete form, wherein a person skilled in the art, aware of the disclosed concept of the invention, can perform manifold modifications, for example, with respect to the function or the arrangement of individual elements mentioned in an example embodiment, without leaving the scope of protection, which is defined by the claims and the legal equivalents thereof, for example, more extensive explanations in the description.

LIST OF REFERENCE NUMERALS

101 first interface
102 second interface
103 first unit
104 second unit
105 third unit
106 storage unit
107 transmission unit
201-206 method steps

The invention claimed is:

1. A multicopter to measure wind speed, the multicopter comprising:
a number N of electric motors $MOT_n$ configured to generate power to drive N propellers $PROP_n$ of the multicopter, where n=1, 2, ..., N and N≥2;
a computing device; and
a non-transitory storage medium comprising instructions that, when executed by the computing device, cause the computing device to perform operations comprising:
providing first parameters P1 comprising: a 3D position $r_B=(x_b, y_b, z_b)$ of a center of gravity B of the multicopter, time derivatives $\dot{r}_B$ and $\ddot{r}_B$, a 3D orientation $o_M=(\alpha_M, \beta_M, \gamma_M)$ of the multicopter, and a time derivative $\dot{o}_M$ of the 3D orientation $o_M$;
providing an aerodynamic power $P_{a,n}$ currently generated by respective propellers $PROP_n$;
determining horizontal components $(v_{r,x}, v_{r,y})$ of a relative speed $v_r:=(v_{r,x}, v_{r,y}, v_{r,z})^T$ of the multicopter in relation to air based on the first parameters P1, a model M1 that describes dynamics of the multicopter, and an estimation of a force wrench $\tau_e$ acting externally on the multicopter, wherein the estimation is determined based on the model M1;
determining a vertical component $(v_{r,z})$ of the relative speed $v_r$ based on the horizontal components $(v_{r,x}, v_{r,y})$ and the aerodynamic power $P_{a,n}$;
during flight of the multicopter, determining a wind speed $v_w$ in an inertial system based on the horizontal components $(v_{r,x}, v_{r,y})$, the vertical component $(v_{r,z})$, and the parameters P1; and
storing a wind speed $v_w(r_B)=(v_{w,x}(r_B), v_{w,y}(r_B), v_{w,z}(r_B))$ determined for position $r_B$, or wirelessly transmitting the wind speed $v_w(r_B)$ to a receiver.

2. The multicopter as claimed in claim 1, wherein the the operations further comprise solving the following nonlinear quadratic minimization problem for a number of a total of K measurements of the aerodynamic power $P_{a,n}$ for f where k=1, ..., K and k≥1:

$$(1)\ \bar{f} = \frac{1}{2}F^T F$$

wherein the following applies:

$$F(v_{r,x}, v_{r,y}, v_{r,z}, v_{i,1}, v_{h,1}, P_{a,1}, \ldots, v_{i,K}, v_{h,K}, P_{a,K})=0, \quad (2)$$

$$F=[F_{1,1}, F_{2,1}, F_{3,1}, \ldots, F_{1,K}, F_{2,K}, F_{3,K}], \quad (3)$$

$$F_{1,k}=v_{i,k}^4 - 2v_{i,k}^3 v_{r,z} + v_{i,k}^2 (v_{r,x}^2 + v_{r,y}^2 + v_{r,z}^2) - v_{h,k}^4 = 0, \quad (4)$$

$$F_{2,k}=v_{i,k} U_k (v_{i,k} - v_{r,z}) - P_{a,k}/(2\rho A_n)=0, \quad (5)$$

$$F_{3,k}=v_{h,k}^2 (v_{i,k} - v_{r,z}) - P_{a,k}/(2\rho A_n)=0,\ \text{and} \quad (6)$$

$$U_k = \sqrt{v_{r,x}^2 + v_{r,y}^2 + (v_{i,k} - v_{r,z})^2} \quad (7)$$

where
$A_n$: area swept by the n-th propeller,
$\rho$: air density,
$v_{h,k}(P_{a,n,k})$: induced speed of the n-th propeller in hovering flight for the k-th measurement, and
$v_{i,k}(P_{a,n,k})$: speed induced by the n-th propeller for the k-th measurement.

3. The multicopter as claimed in claim 2, wherein the operations associated with solving the minimization further comprise:
exchanging data with a control center or one or more other multicopters in a data network to solve the minimization problem; and
receiving a solution to the minimization problem from the control center or at least one of the one or more other multicopters.

4. The multicopter as claimed in claim 2, wherein a horizontal component ($v_{r,x}$, $v_{r,y}$) of the relative speed $v_r$ is taken into consideration in the nonlinear quadratic minimization problem by the following relationships:

$$F_{4,k} = v_{r,x,k} - v_{r,x} = 0, \text{ and} \quad (9)$$

$$F_{5,k} = v_{r,y,k} - v_{r,y} = 0. \quad (10)$$

5. The multicopter as claimed in claim 2, wherein the model M1 is based on the following movement equation:

$$M\dot{v} + C(v)v + g_M = J^T \tau + \tau_e \quad (1)$$

wherein the following applies: $\tau_e = \tau_d(v_r)$ and $v_r = \dot{r}_B - v_w$,
M: generalized mass of the multicopter,
v: generalized speed $[\dot{r}_b^T, \omega^T]$,
$\dot{v}$: time derivative of v, $$C(v) := \begin{bmatrix} 0_{3 \times 3} & 0_{3 \times 3} \\ 0_{3 \times 3} & -(I\omega) \times \end{bmatrix},$$

I: moment of inertia of the multicopter,
ω: angular speed of the multicopter,
×: skew symmetric matrix operator,
$g_M$: weight of the multicopter,
J: block diagonals of a Jacobian matrix,
τ: target force wrench $[f^T, \overline{m}^T]$ to be generated by the electric motors $MOT_n$,
$\tau_e$: force wrench $[f_e^T, \overline{m}_e^T]$ acting externally on the multicopter,
$\tau_d(v_r)$: external force wrench generated exclusively by air friction,
$v_r := (v_{r,x}, v_{r,y}, v_{r,z})^T$ relative speed of the multicopter in relation to the air, and
$v_w := (v_{w,x}, v_{w,y}, v_{w,z})^T$ wind speed.

6. The multicopter as claimed in claim 1, wherein the operations further comprise exchanging data with one or more other multicopters in a data network to receive wind speed: $v_w(r_B) = (v_{w,x}(r_B), v_{w,y}(r_B), v_{w,z}(r_B))$ respectively determined by each of the one or more other multicopters.

7. The multicopter as claimed in claim 6, wherein the one or more other multicopters are embodied as agents or softbots for wireless communication in the data network.

8. The multicopter as claimed in claim 6, wherein the operations further comprise regulating the electric motors $MOT_n$ of the multicopter taking into consideration the wind speed received from each of the one or more other multicopters: $v_w(r_B) = (v_{w,x}(r_B), v_{w,y}(r_B), v_{w,z}(r_B))$.

9. The multicopter as claimed in claim 6, wherein operations further comprise receiving from the one or more other multicopters the 3D position $r_B$ of a center of gravity B, the time derivatives: $\dot{r}_B$ and $\ddot{r}_B$, the 3D orientation $o_M$, and the time derivative $\dot{o}_M$ of a respective multicopter, the force wrench $\tau_e$ acting externally on the respective multicopter, and the aerodynamic power $P_{a,n}$ generated by the respective multicopter.

10. The multicopter as claimed in claim 1, wherein the operations further comprise regulating the electric motors $MOT_n$ to maximize projection of the wind speed $v_w$ on direction of an axis of rotation of the propellers $PROP_n$.

11. The multicopter as claimed in claim 1, wherein in order to provide the aerodynamic power $P_{a,n}$ per electric motor $MOT_n$, the multicopter further comprises a motor current sensor configured to detect a motor current, and a motor rotational speed sensor or a motor rotational speed estimator configured to detect a motor rotation speed, and wherein the operations further comprise determining the aerodynamic power $P_{a,n}$ per electric motor $MOT_n$ based on a predetermined model M2 that describes a dynamic motor model, the motor current, and the motor rotational speed.

12. A method of measuring wind speed using a multicopter, the method comprising:
providing the multicopter having a number N of electric motors $MOT_n$ that generate power to drive N propellers $PROP_n$ of the multicopter, where n=1, 2, ..., N and N≥2;
providing first time-dependent parameters P1 comprising: a 3D position $r_B = (x_b, y_b, z_b)$ of a center of gravity B of the multicopter, time derivatives $\dot{r}_B$ and $\ddot{r}_B$, a 3D orientation $o_M = (\alpha_M, \beta_M, \gamma_M)$ of the multicopter, and a time derivative $\dot{o}_M$ of the 3D orientation $o_M$;
providing an aerodynamic power $P_{a,n}$ currently generated by the respective propellers $PROP_n$;
determining horizontal components ($v_{r,x}$, $v_{r,y}$) of a relative speed $v_r$ of the multicopter in relation to air based on the first parameters P1, a model M1 that describes dynamics of the multicopter, and an estimation of a force wrench $\tau_e$ acting externally on the multicopter, wherein the estimation is determined based on the model M1;
determining a vertical component ($v_{r,z}$) of the relative speed $v_r$ based on the horizontal components ($v_{r,x}$, $v_{r,y}$) and the aerodynamic power $P_{a,n}$;
during flight of the multicopter, determining wind speed $v_w$ in an inertial system based on the horizontal components ($v_{r,x}$, $v_{r,y}$), the vertical component ($v_{r,z}$), and the parameters P1; and
storing a wind speed $v_w(r_B) = (v_{w,x}(r_B), v_{w,y}(r_B), v_{w,z}(r_B))$ determined for position $r_B$, or transmitting the wind speed $v_w(r_B)$ to a receiver.

13. The method as claimed in claim 12, wherein the method further comprises regulating the electric motors $MOT_n$ to maximize projection of the wind speed $v_w$ on direction of an axis of rotation of the propellers $PROP_n$.

14. The method as claimed in claim 12, wherein in order to provide the aerodynamic power $P_{a,n}$ per electric motor $MOT_n$, the method further comprises:
detecting a motor current and a motor rotational speed; and
determining the aerodynamic power $P_{a,n}$ per electric motor $MOT_n$ based on a predetermined model M2 that describes a dynamic motor model, the motor current, and the motor rotational speed.

15. The method as claimed in claim 12, wherein the method further comprises solving the following nonlinear quadratic minimization problem for a number of a total of K measurements of the aerodynamic power $P_{a,n}$ for f where k=1, ..., K and k≥1:

$$(1) \; \bar{f} = \frac{1}{2} F^T F$$

wherein the following applies:

$$F(v_{r,x}, v_{r,y}, v_{r,z}, v_{i,1}, v_{h,1}, P_{a,1}, \ldots, v_{i,K}, v_{h,K}, P_{a,K}) = 0, \quad (2)$$

$$F = [F_{1,1}, F_{2,1}, F_{3,1}, \ldots, F_{1,K}, F_{2,K}, F_{3,K}], \quad (3)$$

$$F_{1,k} = v_{i,k}^4 - 2v_{i,k}^3 v_{r,z} + v_{i,k}^2 (v_{r,x}^2 + v_{r,y}^2 + v_{r,z}^2) - v_{h,k}^4 = 0, \quad (4)$$

$$F_{2,k} = v_{i,k} U_k (v_{i,k} - v_{r,z}) - P_{a,k}/(2\rho A_n) = 0, \quad (5)$$

$$F_{3,k} = v_{h,k}^2(v_{i,k}-v_{r,z}) - P_{a,k}/(2\rho A_n) = 0, \text{ and} \quad (6)$$

$$U_k = \sqrt{v_{r,x}^2 + v_{r,y}^2 + (v_{i,k}-v_{r,z})^2} \quad (7)$$

where $A_n$: area swept by the n-th propeller, $\rho$: air density, $v_{h,k}(P_{a,n,k})$: induced speed of the n-th propeller in hovering flight for the k-th measurement, and $v_{i,k}(P_{a,n,k})$: speed induced by the n-th propeller for the k-th measurement.

16. The method as claimed in claim 15, wherein a horizontal component ($v_{r,x}$, $v_{r,y}$) of the relative speed $v_r$ is taken into consideration in the nonlinear quadratic minimization problem by the following relationships:

$$F_{4,k} = v_{r,x,k} - v_{r,x} = 0, \text{ and} \quad (9)$$

$$F_{5,k} = v_{r,y,k} - v_{r,y} = 0. \quad (10)$$

17. The method as claimed in claim 15, wherein the model M1 is based on the following movement equation:

$$M\dot{v} + C(v)v + g_M = J^T\tau + \tau_e \quad (1)$$

wherein the following applies: $\tau_e = \tau_d(v_r)$ and $v_r = \dot{r}_B - v_w$ M: generalized mass of the multicopter, v: generalized speed $[\dot{r}_b^T, \omega^T]$, $\dot{v}$: time derivative of v, $$C(v) := \begin{bmatrix} 0_{3\times 3} & 0_{3\times 3} \\ 0_{3\times 3} & -(I\omega)\times \end{bmatrix},$$

I: moment of inertia of the multicopter, $\omega$: angular speed of the multicopter, $\times$: skew symmetric matrix operator, $g_M$: weight of the multicopter, J: block diagonals of a Jacobian matrix, $\tau$: target force wrench $[f^T, \overline{m}^T]$ to be generated by the electric motors $MOT_n$, $\tau_e$: force wrench $[f_e^T, \overline{m}_e^T]$ acting externally on the multicopter, $\tau_d(v_r)$: external force wrench generated exclusively by air friction, $v_r := (v_{r,x}, v_{r,y}, v_{r,z})^T$ relative speed of the multicopter in relation to the air, and $v_w := (v_{w,x}, v_{w,y}, v_{w,z})^T$ wind speed.

18. The method as claimed in claim 15, wherein solving the nonlinear quadratic minimization problem minimization comprises:

exchanging data with a control center or one or more other multicopters in a data network to solve the minimization problem; and receiving a solution to the minimization problem from the control center or at least one of the one or more other multicopters.

19. The method as claimed in claim 12, wherein the method further comprises exchanging data with one or more other multicopters in a data network to receive wind speed: $v_w(r_B) = (v_{w,x}(r_B), v_{w,y}(r_B), v_{w,z}(r_B))$ respectively determined by each of the one or more other multicopters.

20. The method as claimed in claim 19, wherein the one or more other multicopters are embodied as agents or softbots for wireless communication in the data network.

21. The method as claimed in claim 19, wherein the method further comprises regulating the electric motors $MOT_n$ of the multicopter taking into consideration the wind speed received from each of the one or more other multicopters: $v_w(r_B) = (v_{w,x}(r_B), v_{w,y}(r_B), v_{w,z}(r_B))$.

22. The method as claimed in claim 19, wherein the method further comprises receiving from the one or more other multicopters the 3D position $r_B$ of a center of gravity B, the time derivatives: $\dot{r}_B$ and $\ddot{r}_B$, the 3D orientation $o_M$, and the time derivative $\dot{o}_M$ of a respective multicopter, the force wrench $\tau_e$ acting externally on the respective multicopter, and the aerodynamic power $P_{a,n}$ generated by the respective multicopter.

* * * * *